United States Patent
Khoshnevisan et al.

(10) Patent No.: US 11,924,827 B2
(45) Date of Patent: Mar. 5, 2024

(54) UE PROCESSING TIME FOR PDSCH REPETITION IN THE SAME SLOT

(71) Applicant: QUALCOMM Incorporated, San Diego, CA (US)

(72) Inventors: Mostafa Khoshnevisan, San Diego, CA (US); Tae Min Kim, San Diego, CA (US); Xiaoxia Zhang, San Diego, CA (US); Yuanning Yu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/178,999

(22) Filed: Feb. 18, 2021

(65) Prior Publication Data

US 2021/0266938 A1 Aug. 26, 2021

Related U.S. Application Data

(60) Provisional application No. 62/979,988, filed on Feb. 21, 2020.

(51) Int. Cl.
*H04W 72/12* (2023.01)
*H04L 1/1812* (2023.01)
(Continued)

(52) U.S. Cl.
CPC ....... *H04W 72/1273* (2013.01); *H04L 1/1812* (2013.01); *H04W 8/22* (2013.01); *H04W 72/23* (2023.01)

(58) Field of Classification Search
CPC ... H04W 72/1273; H04W 8/22; H04W 72/23; H04L 1/1812; H04L 1/1864;
(Continued)

(56) References Cited

U.S. PATENT DOCUMENTS 10,015,049 B2 * 7/2018 Sabev ................. H04L 41/0846
10,952,231 B2 * 3/2021 Liou ..................... H04L 5/0051
(Continued)

FOREIGN PATENT DOCUMENTS

CN 108352932 A 7/2018
CN 110710318 A 1/2020
(Continued)

OTHER PUBLICATIONS

International Search Report and Written Opinion—PCT/US2021/018717—ISA/EPO—dated Jun. 22, 2021 (202754WO).
(Continued)

*Primary Examiner* — Jay P Patel
(74) *Attorney, Agent, or Firm* — Norton Rose Fulbright US LLP

(57) ABSTRACT

In some implementations, a method of wireless communication includes receiving, at a user equipment (UE) from a base station, a downlink control information (DCI) scheduling a physical downlink shared channel (PDSCH). The PDSCH includes a first transmission occasion and a second transmission occasion following the first transmission occasion during a single slot. The method further includes determining, at the UE, an overall processing time following a last symbol of the PDSCH.

33 Claims, 9 Drawing Sheets

(51) Int. Cl.
*H04W 8/22* (2009.01)
*H04W 72/1273* (2023.01)
*H04W 72/23* (2023.01)

(58) Field of Classification Search
CPC ... H04L 5/0096; H04L 5/0044; H04L 5/0007; H04L 1/1887; H04L 1/1854; H04L 1/1896; H04L 5/0094; H04L 1/08
See application file for complete search history.

(56) References Cited

U.S. PATENT DOCUMENTS

| | | | |
|---|---|---|---|
| 11,224,064 B2* | 1/2022 | Gao | H04L 27/2662 |
| 11,457,467 B2* | 9/2022 | Kim | B60W 30/14 |
| 2019/0149365 A1 | 5/2019 | Chatterjee et al. | |
| 2020/0008225 A1 | 1/2020 | Lee et al. | |
| 2020/0053580 A1 | 2/2020 | Bagheri et al. | |
| 2020/0146034 A1* | 5/2020 | Bagheri | H04W 72/1268 |
| 2020/0351926 A1* | 11/2020 | Bagheri | H04W 72/23 |
| 2021/0045159 A1* | 2/2021 | Lei | H04W 72/23 |
| 2021/0051652 A1* | 2/2021 | Khoshnevisan | H04L 5/0055 |
| 2021/0112583 A1* | 4/2021 | Gao | H04W 72/23 |
| 2021/0136830 A1* | 5/2021 | Lin | H04W 72/23 |
| 2021/0184804 A1* | 6/2021 | Park | H04L 1/1822 |
| 2021/0227564 A1* | 7/2021 | Khoshnevisan | H04W 72/1273 |
| 2022/0131642 A1* | 4/2022 | Kim | H04L 5/0053 |
| 2022/0150011 A1* | 5/2022 | Kim | H04L 5/0048 |
| 2022/0256566 A1* | 8/2022 | Gao | H04W 72/1263 |
| 2022/0377796 A1* | 11/2022 | Jung | H04L 1/1864 |
| 2022/0394708 A1* | 12/2022 | Gao | H04W 72/0446 |

FOREIGN PATENT DOCUMENTS

| | | | | |
|---|---|---|---|---|
| WO | WO-2019139405 A1 | 7/2019 | | |
| WO | WO-2020032637 A1 | 2/2020 | | |
| WO | WO-2020032757 A1 | 2/2020 | | |
| WO | WO-2020033640 A1 | 2/2020 | | |
| WO | WO-2020033884 A1 | 2/2020 | | |
| WO | WO-2020146853 A1 * | 7/2020 | | H04B 7/024 |
| WO | WO-2021151481 A1 * | 8/2021 | | H04L 5/14 |

OTHER PUBLICATIONS

NTT DOCOMO, et al., "Enhancements on Multi-TRP/Panel Transmission" 3GPP Draft, 3GPP TSG RAN WG1 #96, R1-1902812, Enhancements on Multi-TRP_Panel Transmission, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25-Mar. 1, 2019, Feb. 16, 2019, XP051600507, 25 Pages, Retrieved from the Internet: URL: http://www.3gpp.org/ftp/tsg%5Fran/WG1%5FRL1/TSGR1%5F96/Docs/R1%2D1902812%2Ezip [retrieved on Feb. 16, 2019].
Partial European Search Report—EP23169266—Search Authority—The Hague—dated Nov. 10, 2023 (202754EPD1).

* cited by examiner

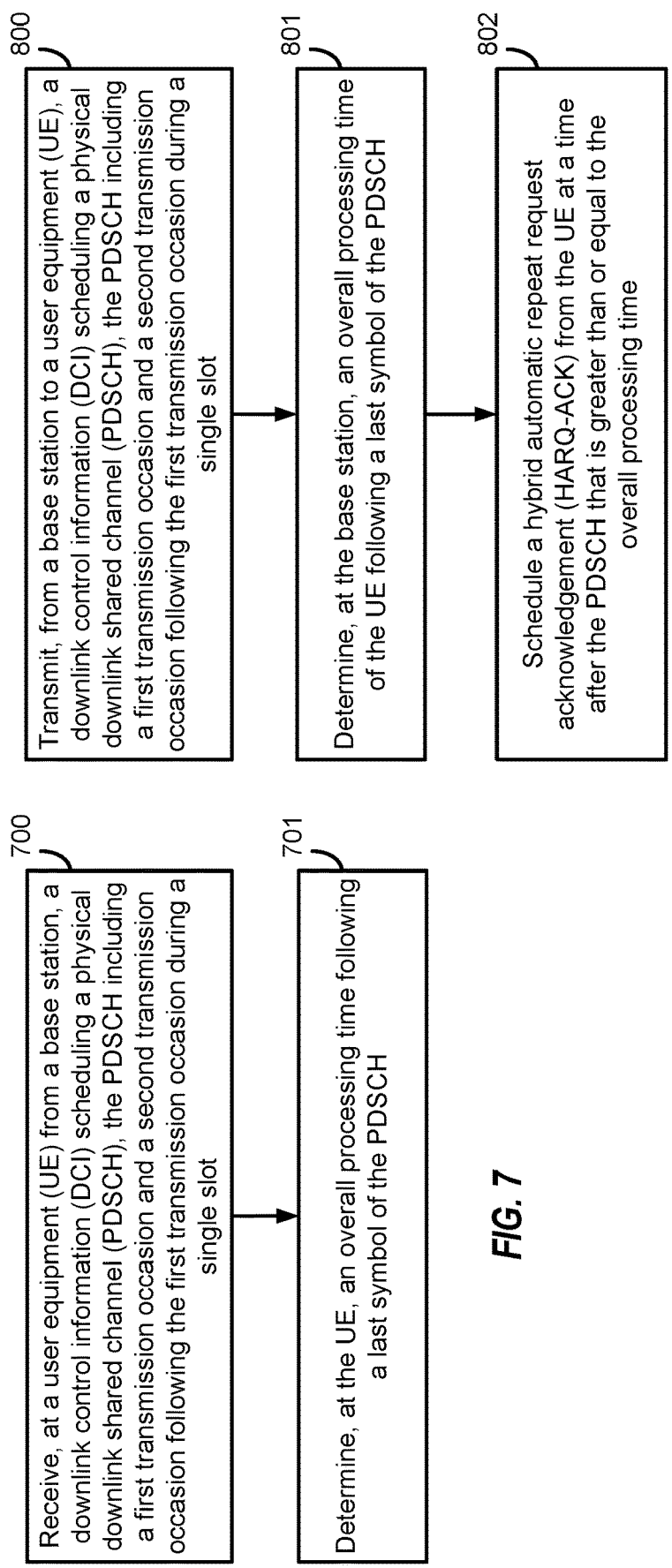

UE PROCESSING TIME FOR PDSCH REPETITION IN THE SAME SLOT

CROSS-REFERENCE TO RELATED APPLICATIONS

This application claims the benefit of U.S. Provisional Patent Application No. 62/979,988, entitled, "UE PROCESSING TIME FOR PDSCH REPETITION IN THE SAME SLOT," filed on Feb. 21, 2020, which is expressly incorporated by reference herein in its entirety.

TECHNICAL FIELD

Aspects of the present disclosure relate generally to wireless communication systems, and more particularly, to enabling physical downlink shared channel (PDSCH) repetition in the same slot.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a user equipment (UE) from a base station, a downlink control information (DCI) scheduling a physical downlink shared channel (PDSCH), the PDSCH including a first transmission occasion and a second transmission occasion following the first transmission occasion during a single slot. The method further includes determining, at the UE, an overall processing time following a last symbol of the PDSCH.

In an additional aspect of the disclosure, an apparatus configured for wireless communication is disclosed. The apparatus includes at least one processor, and memory coupled to the at least one processor, the memory comprising instructions executable by the at least one processor to cause the apparatus to receive, at a user equipment (UE) from a base station, a downlink control information (DCI) scheduling a physical downlink shared channel (PDSCH), the PDSCH including a first transmission occasion and a second transmission occasion following the first transmission occasion during a single slot. The instructions are further executable by the at least one processor to determine, at the UE, an overall processing time following a last symbol of the PDSCH.

In an additional aspect of the disclosure, an apparatus configured for wireless communication is disclosed. The apparatus includes means for receiving, at a user equipment (UE) from a base station, a downlink control information (DCI) scheduling a physical downlink shared channel (PDSCH), the PDSCH including a first transmission occasion and a second transmission occasion following the first transmission occasion during a single slot. The apparatus further includes means for determining, at the UE, an overall processing time following a last symbol of the PDSCH.

In an additional aspect of the disclosure, a non-transitory computer-readable medium stores instructions that, when executed by a processor, cause the processor to perform operations including receiving, at a user equipment (UE) from a base station, a downlink control information (DCI) scheduling a physical downlink shared channel (PDSCH), the PDSCH including a first transmission occasion and a second transmission occasion following the first transmission occasion during a single slot. The operations further include determining, at the UE, an overall processing time following a last symbol of the PDSCH.

In an additional aspect of the disclosure, a method of wireless communication includes transmitting, from a base station to a user equipment (UE), a downlink control information (DCI) scheduling a physical downlink shared channel (PDSCH), the PDSCH including a first transmission occasion and a second transmission occasion following the first transmission occasion during a single slot. The method also includes determining, at the base station, an overall processing time of the UE following a last symbol of the PDSCH. The method further includes scheduling a hybrid automatic repeat request acknowledgement (HARQ-ACK) from the UE at a time after the PDSCH that is greater than or equal to the overall processing time.

In an additional aspect of the disclosure, an apparatus configured for wireless communication is disclosed. The apparatus includes at least one processor, and memory coupled to the at least one processor, the memory comprising instructions executable by the at least one processor to cause the apparatus to initiate transmission, from a base station to a user equipment (UE), of a downlink control information (DCI) scheduling a physical downlink shared channel (PDSCH), the PDSCH including a first transmission occasion and a second transmission occasion following the first transmission occasion during a single slot. The instructions are further executable by the at least one processor to determine, at the base station, an overall processing time of the UE following a last symbol of the PDSCH. The instructions are further executable by the at least one processor to schedule a hybrid automatic repeat request acknowledgement (HARQ-ACK) from the UE at a time after the PDSCH that is greater than or equal to the overall processing time.

In an additional aspect of the disclosure, an apparatus configured for wireless communication is disclosed. The apparatus includes means for transmitting, from a base station to a user equipment (UE), a downlink control information (DCI) scheduling a physical downlink shared channel (PDSCH), the PDSCH including a first transmission occasion and a second transmission occasion following the first transmission occasion during a single slot. The apparatus also includes means for determining, at the base station, an overall processing time of the UE following a last symbol of the PDSCH. The apparatus further includes means for scheduling a hybrid automatic repeat request acknowledgement (HARQ-ACK) from the UE at a time after the PDSCH that is greater than or equal to the overall processing time.

In an additional aspect of the disclosure, a non-transitory computer-readable medium stores instructions that, when executed by a processor, cause the processor to perform operations including initiating transmission, from a base station to a user equipment (UE), of a downlink control information (DCI) scheduling a physical downlink shared channel (PDSCH), the PDSCH including a first transmission occasion and a second transmission occasion following the first transmission occasion during a single slot. The operations also include determining, at the base station, an overall processing time of the UE following a last symbol of the PDSCH. The operations further include scheduling a hybrid automatic repeat request acknowledgement (HARQ-ACK) from the UE at a time after the PDSCH that is greater than or equal to the overall processing time.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating an example of a method of determining an overall processing time at a UE based on a PDSCH that includes two transmission occasions according to some aspects.

FIG. 8 is a flow diagram illustrating an example of a method of determining, at a base station, an overall processing time at a UE based on a PDSCH including two transmission occasions according to some aspects.

DETAILED DESCRIPTION

Figure 1:
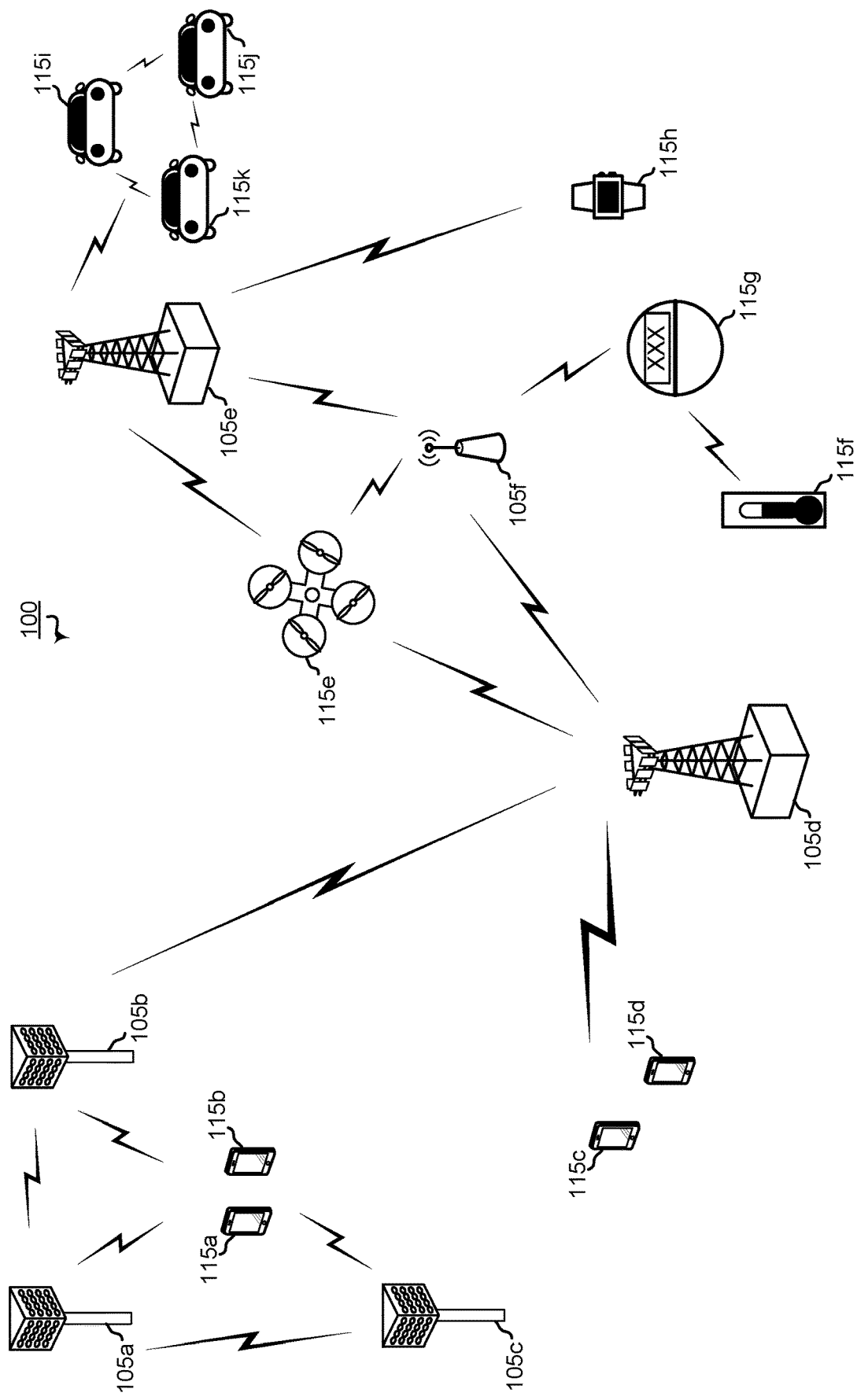
FIG. 1 is a block diagram illustrating details of a wireless communication system according to some aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, gaming devices, reality modification devices (e.g., extended reality (XR), augmented reality (AR), virtual reality (VR)), entertainment devices, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 can support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
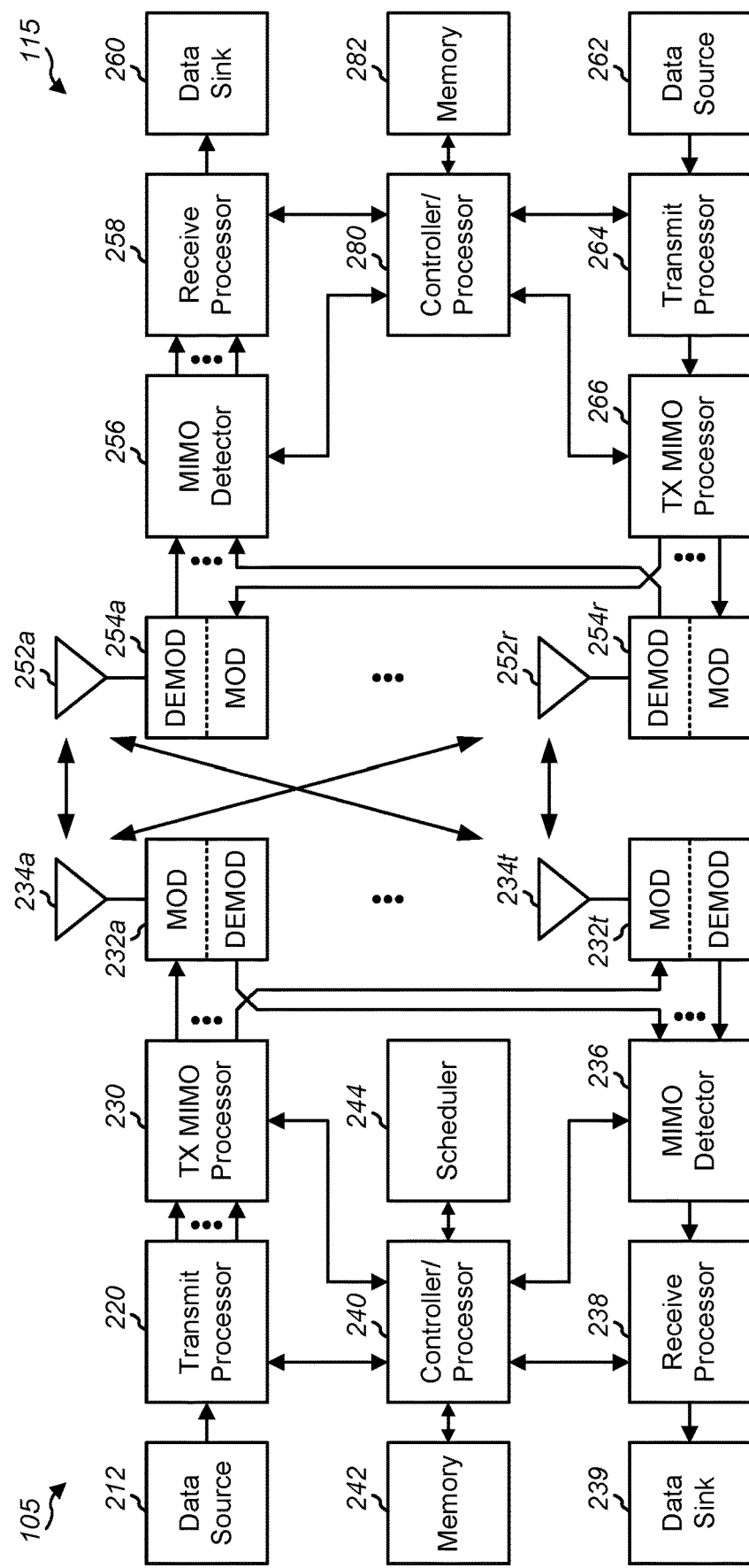
FIG. 2 is a block diagram conceptually illustrating a design of a base station and a UE configured according to some aspects.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In 5G NR communications systems, a UE may receive a transmission from a base station via a physical downlink shared channel (PDSCH). The PDSCH may be scheduled, by the base station, for transmission during a time slot (e.g., a plurality of symbols). For example, a time slot may include fourteen symbols, and the PDSCH may be scheduled for four of the fourteen symbols, as a non-limiting example. After the UE receives the PDSCH, there is an overall processing time (e.g., a number of symbols) for the UE to decode a downlink control information (DCI) that schedules the PDSCH, receive the PDSCH and decode the transport block (TB) included within, and to prepare a hybrid automatic repeat request acknowledgement (HARQ-ACK) corresponding to the PDSCH. Thus, the overall processing time represents the minimum time (e.g., the minimum number of symbols) between a final symbol of the PDSCH and a first symbol of the HARQ-ACK that is transmitted via a physical uplink control channel (PUCCH).

The overall processing time includes a first portion of processing time and a second portion of processing time. In at least some wireless communication standards, such as 3GPP wireless communication standards, the first portion of processing time is designated $N_1$ and the second portion of processing time is designated $d_{1,1}$. $N_1$ (e.g., the first portion of processing time) is determined based on a UE processing capability (e.g., a UE may be programmed with one of two UE processing capabilities), subcarrier spacing, and, if the UE has a first UE capability, whether one or more additional positions for demodulation reference signal (DMRS) symbols are configured. $N_1$ (in symbols) for UEs having the first UE processing capability may be given by Table 1 below, where μ is the subcarrier spacing (e.g., 0 corresponds to 15 kilohertz (kHz), 1 corresponds to 30 kHz, 2 corresponds to 60 kHz, and 3 corresponds to 120 kHz):

TABLE 1

| μ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

$N_1$ (in symbols) for UEs having a second UE processing capability may be given by Table 2 below, where μ is the subcarrier spacing:

TABLE 2

| μ | dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

The second portion of processing time (e.g., $d_{1,1}$) may be determined based on a PDSCH mapping type (e.g., a PDSCH may have one of two mapping types, mapping type A or mapping type B), the UE processing capability, a length L of the PDSCH, and a number of overlapping symbols between a DCI that schedules the PDSCH and the PDSCH itself. Descriptions of how $d_{1,1}$ is determined are further described herein. Once $N_1$ and $d_{1,1}$ are determined, the overall processing time is the sum of $N_1$ and $d_{1,1}$.

The overall processing time may be determined when the PDSCH includes a single transmission occasion (e.g., there is one TB included in the PDSCH). However, in some of the more recent wireless communication standards (e.g., 3GPP wireless communication standards, as a non-limiting example), repetition of PDSCH within a single slot is allowed (e.g., referred to as "TDMSchemeA" in at least one wireless communication standard). In such a scheme, a single DCI scheduling a PDSCH may indicate two transmission configuration indicator (TCI) states within a single slot, with non-overlapped time resource allocation. In such implementations, the PDSCH includes two transmission occasions for the same TB, where each instance of the TB has its own TCI state and redundancy version (RV) with the time granularity of mini-slots. For example, a TCI codepoint included in the DCI may be a multi-bit value that indicates one or two TCI states. The mapping between the codepoint values and the various TCI states may be done through radio resource control (RRC) signaling or through medium access control (MAC) control elements (MAC CEs). The number of transmission occasions scheduled in the PDSCH is determined by the number of TCI states indicated by the DCI (e.g., if one TCI state is indicated, one transmission occasion is scheduled, and if two TCI states are indicated, two transmission occasions are scheduled). The starting symbol and length of the first transmission occasion may be specified by the DCI (e.g., in a start and length indicator value (SLIV) in a time domain resource allocation field (TDRA) of the DCI). The length of the second transmission occasion is the same as the length of the first transmission occasion. There may be a one or more symbol offset between the last symbol of the first transmission occasion and the first symbol of the second transmission occasion. This offset value (referred to as K) may be configured in RRC signaling, or if not configured, is defaulted to zero (e.g., no offset between the transmission occasions).

A UE may receive the PDSCH having two transmission occasions and may perform decoding on the first transmission occasion, the perform soft combining for both PDSCH transmission occasions. Soft combining may be performed because both transmission occasions correspond to the same TB. However, the UE may not be able to determine the overall processing time for a PDSCH with two transmission occasions within the same slot. To illustrate, the two transmission occasions may correspond to different PDSCH mapping types or may have different overlaps between symbols of the DCI and symbols of the PDSCH.

The present disclosure provides systems, apparatus, methods, and computer-readable media for enabling determination (at a UE and/or at a base station) of an overall processing time of a UE for a PDSCH that includes multiple transmission occasions, such as based on a DCI that indicates multiple TCI states. For example, a second portion of the overall processing time (e.g., $d_{1,1}$) may be determined based on a mapping type of a first transmission occasion of a PDSCH, a mapping type of a second transmission occasion of the PDSCH, a processing capability of the UE, a length of the first transmission occasion, a number of symbols of the DCI that overlap the first transmission occasion, or a combination thereof. In some implementations, the second portion of the overall processing time may be determined based further on a length of the second transmission occasion, a number of symbols of the DCI that overlap the second transmission occasion, a symbol offset between the first transmission occasion and the second transmission occasion, or a combination thereof. The present disclosure provides multiple alternatives for determining $d_{1,1}$ based on this information. Thus, a HARQ-ACK can be scheduled based on the overall processing time, which enables a wireless communication system to support repetition of PDSCH within a single slot.

Figure 3:
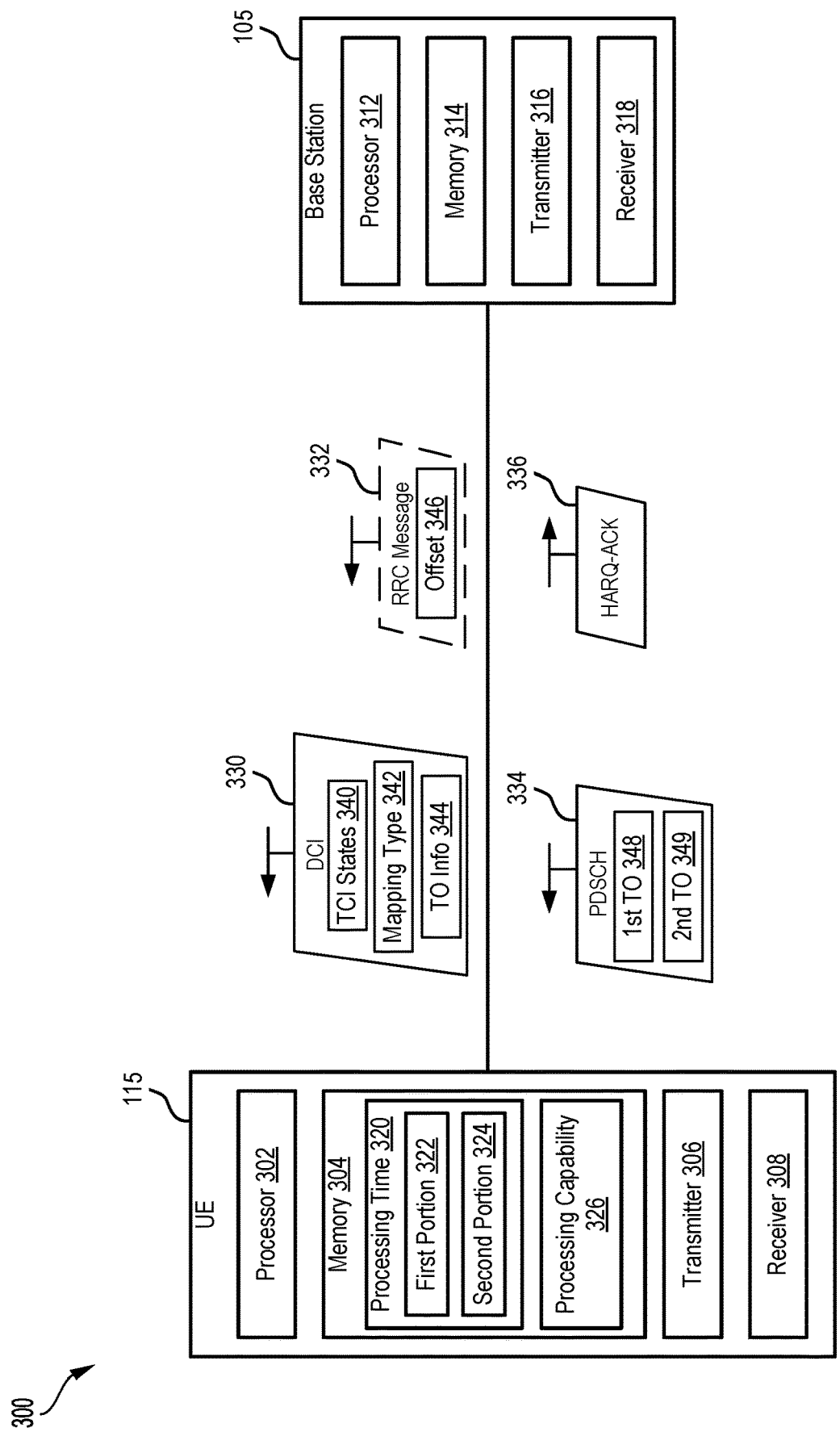
FIG. 3 is a block diagram of a wireless communication system configured to enable physical downlink shared channel (PDSCH) repetition in the same slot according to some aspects.

FIG. 3 is a block diagram of an example wireless communications system 300 configured to enable PDSCH repetition (e.g., two or more transmission occasions) in the same slot (or in consecutive slots). In some examples, wireless communications system 300 may implement aspects of wireless network 100. Wireless communications system 300 includes UE 115 and base station 105. Although one UE and one base station are illustrated, in other implementations, wireless communications system 300 may include more than one UE, more than one base station, or both.

UE 115 can include a variety of components (e.g., structural, hardware components) used for carrying out one or more functions described herein. For example, these components can include a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282.

Transmitter 306 is configured to transmit data to one or more other devices, and receiver 308 is configured to receive data from one or more other devices. For example, transmitter 306 may transmit data, and receiver 308 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

Base station 105 can include a variety of components (e.g., structural, hardware components) used for carrying out one or more functions described herein. For example, these components can include processor 312, memory 314, transmitter 316, and receiver 318. Processor 312 may be configured to execute instructions stored at memory 314 to perform the operations described herein. In some implementations, processor 312 includes or corresponds to controller/processor 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

In a particular implementation, wireless communications system 300 includes a 5G network. For example, UE 115 may include a 5G UE (e.g., a UE configured to operate in accordance with a 5G network). Base station 105 may include a 5G base station (e.g., a base station configured to operate in accordance with a 5G network).

During operation of wireless communications system 300, UE 115 receives DCI 330 from base station 105. DCI 330 schedules PDSCH 334. DCI 330 may indicate that PDSCH 334 has multiple (e.g., two or more) transmission occasions. For example, DCI 330 includes TCI states 340 (e.g., a TCI codepoint or a TCI field). Based on the value of TCI states 340, TCI states 340 may indicate a single TCI state or two TCI states. If TCI states 340 indicates two TCI states, UE 115 determines that PDSCH 334 includes two transmission occasions (e.g., a first transmission occasion 348 and a second transmission occasion 349) within the same slot using non-overlapped time resources. Although described herein as having two transmission occasions, in other implementations, PDSCH 334 may have more than two transmission occasions, which may be indicated by the value of TCI states 340 and/or by another value or field of DCI 330.

DCI 330 may include additional information corresponding to one or more of the transmission occasions. For example, DCI 330 may include mapping type 342. In some implementations, mapping type 342 indicates whether a mapping type corresponding to first transmission occasion 348 corresponds to a first mapping type or a second mapping type (e.g., one of at least two mapping types). The first mapping type may be referred to as "mapping type A" and the second mapping type may be referred to as "mapping type B" in at least one wireless communication standard. For a slot that includes fourteen symbols (e.g., symbol 0-symbol 13), if a transmission occasion corresponds to the first mapping type (e.g., mapping type A), a first DMRS symbol of the PDSCH is either on the third symbol (e.g., symbol 2) or the fourth symbol (e.g., symbol 3) of the slot. Which slot the first DMRS symbol is on (e.g., assigned) is indicated by one bit in a master information block (MIB), and the assignment is not dynamic. Additionally, the starting symbol of the PDSCH can be on the first through the fourth symbols (e.g., symbol 0-symbol 3) and is indicated as part of the TDRA field of DCI 330. The starting symbol can be changed dynamically (e.g., different DCIs can schedule PDSCHs that start on different symbols). If a transmission occasion corresponds to the second mapping type (e.g., mapping type B), the first DMRS symbol is the starting symbol of the PDSCH, and the starting symbol of the PDSCH can be any symbol of the slot except for the last symbol (e.g., symbol 13). The starting symbol is indicated as part of the TDRA field of DCI 330. Although mapping type 342 is described as corresponding to first transmission occasion 348, in other implementations, mapping type 342 may correspond to second transmission occasion 349, or two mapping type indicators may be included in DCI 330 (e.g., one for each of the transmission occasions 348-349).

DCI 330 may also include transmission occasion information 344. Transmission occasion information 344 may include information corresponding to first transmission occasion 348. In some implementations, transmission occasion information 344 includes a starting symbol of first transmission occasion 348 and a length of first transmission occasion 348 (in symbols). For example, transmission occasion information 344 may include or correspond to a SLIV included in a TDRA field of DCI 330. In some implementations, the length indicated for first transmission occasion 348 is the same as the length of second transmission occasion 349. In some other implementations, the length of second transmission occasion 349 is not the same as the length of first transmission occasion 348 (and both lengths may be indicated by transmission occasion 344). Although transmission occasion information 344 has been described as corresponding to first transmission occasion 348, in other implementations, transmission occasion information 344 may correspond to second transmission occasion 349 or transmission occasion information 344 may include information that corresponds to first transmission occasion 348 and information that corresponds to second transmission occasion 349.

In some implementations, there is a symbol offset (e.g., K) between the last symbol of first transmission occasion 348 and the first symbol of the second transmission occasion 349. The symbol offset may be RRC configurable. For example, base station 105 may transmit RRC message 332 to UE 115. RRC message 332 may include symbol offset 346 (e.g., K). If symbol offset 346 is equal to zero or is not configured (e.g., RRC message 332 is not transmitted), the starting symbol of second transmission occasion 349 is the next symbol after the last symbol of first transmission occasion 348. If symbol offset 346 is configured, first transmission occasion 348 and second transmission occasion 349 are offset by a number of symbols indicated by symbol offset 346.

After transmitting DCI 330 (and RRC message 332 in some implementations), base station 105 transmits a TB to UE 115 via PDSCH 334. The TB may be transmitted during first transmission occasion 348 and during second transmission occasion 349. The transmission occasions may correspond to different TCI states, and thus correspond to different transmit receive points (TRPs). Transmitting the same TB via different TRPs may improve diversity in the transmission of the TB.

Figure 4:
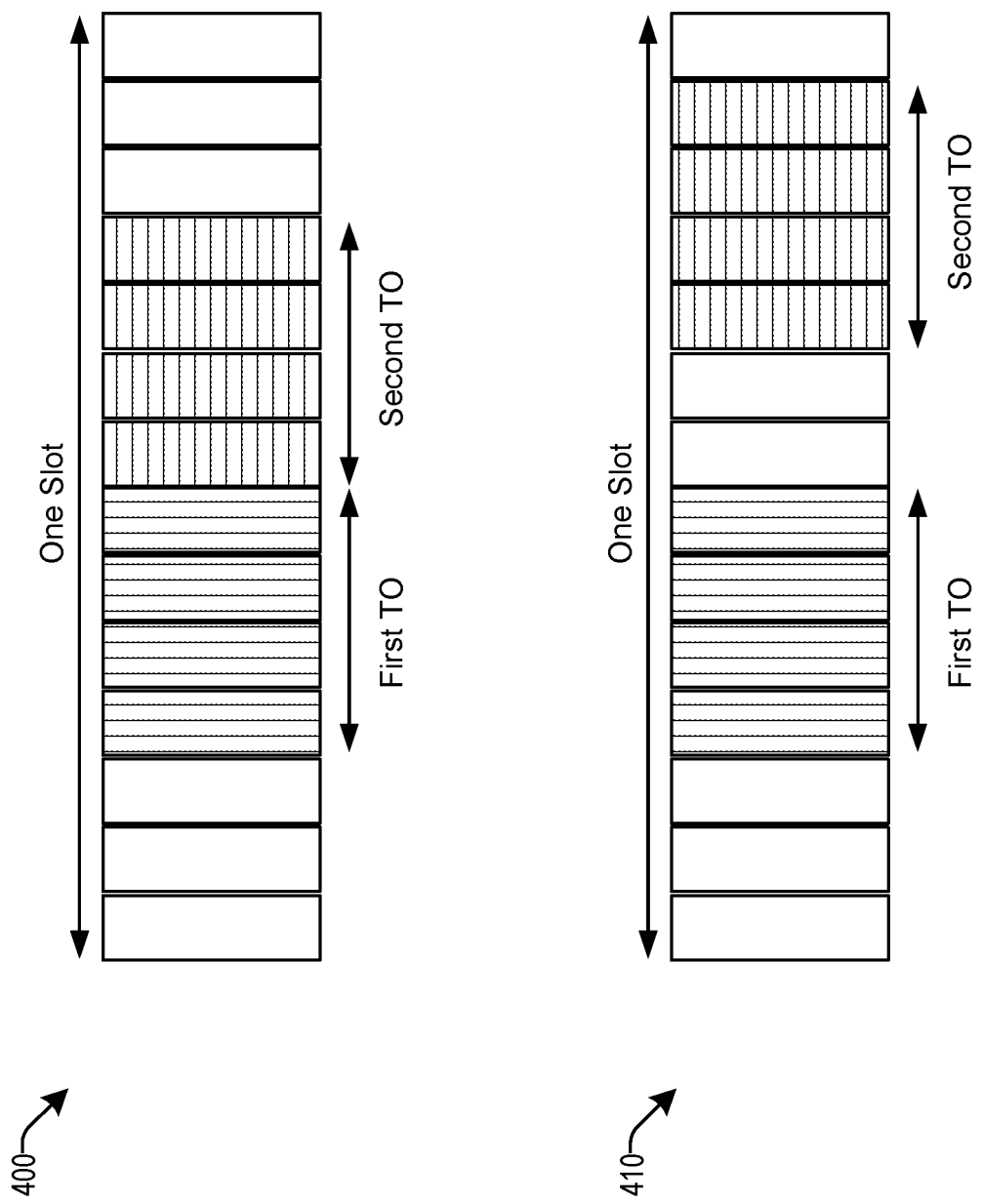
FIG. 4 illustrates various examples of a PDSCH with multiple transmission occasions.

Examples of PDSCHs with multiple transmission occasions are shown in FIG. 4. In a first example 400, a starting symbol of a first transmission occasion (e.g., first transmission occasion 348) is symbol 3 and a length of the first transmission occasion is 4 symbols. This information may be indicated by a SLIV of a TDRA field of a DCI, such as transmission occasion information 344 of DCI 330 of FIG. 3. Thus, the first transmission occasion occupies symbols 3-6 of the slot. Additionally, a symbol offset is set equal to 0 (or is not configured). This may be indicated by symbol offset 346 of RRC message 332 of FIG. 3. Because the symbol offset is 0, a starting symbol of a second transmission occasion (e.g., second transmission occasion 349) immediately follows the last symbol of the first transmission occasion. As explained above, the length of the second transmission occasion is the same as the length of the first transmission occasion. Thus, the second transmission occasion occupies symbols 7-10 of the slot.

In a second example 410, the starting symbol of a first transmission occasion and the length of the first transmission occasion are the same as in the first example 400. However, in the second example, the symbol offset is 2. Because the symbol offset is 2, there are 2 symbols between the last symbol of the first transmission occasion and the first symbol of the second transmission occasion. Thus, the second transmission occasion occupies symbols 9-12 of the slot. These examples are for illustration only, and in other examples, the start value of the first transmission occasion, the length of the transmission occasions, and the symbol offset may be different.

Although two transmission occasions have been illustrated in a single slot, in other implementations, more than two transmission occasions may be included within a single slot, thereby increasing PDSCH repetition. Alternatively, the two (or more) transmission occasions may be included in different slots. For example, two transmission occasions may be included in consecutive slots. As another example, two (or more) transmission occasions may be included in non-consecutive slots. As described above, although the lengths of the transmission occasions are described as being the same, in other implementations, each transmission occasion may have its own length which is different from the length of other transmission occasions. Additionally, or alternatively, although the transmission occasions are described as non-overlapping (e.g., using different resources), in some other implementations, the transmission occasions may at least partially overlap (e.g., multiple transmission occasions may occur during the same symbol). Additionally, or alternatively, although the transmission occasions are described as having separate TCI states, in some other implementations, at least two transmission occasions may share the same TCI state. In some such implementations, an additional value or field may be included in the DCI to indicate the number of transmission occasions if the number of transmission occasions does not correspond to the number of TCI states.

Returning to FIG. 3, after receiving PDSCH 334, UE 115 performs decoding on the TB corresponding to first transmission occasion 348 and then performs soft combining for the TB received during both first transmission occasion 348 and second transmission occasion 349. This enables UE 115 to process the TB in an efficient manner.

UE 115 also determines an overall processing time 320 needed by UE 115 to decode DCI 330, receive PDSCH 334 and decode the TB, and generate a HARQ-ACK 336 responsive to the TB of PDSCH 334. Overall processing time 320 refers to a number of symbols that follow a last symbol of PDSCH 334 (e.g., a last symbol of second transmission occasion 349). Overall processing time 320 may include a first portion 322 and a second portion 324.

Determining first portion 322 (e.g., $N_1$) is the same regardless of whether there is a single transmission occasion or multiple transmission occasions within PDSCH 334 (e.g., within the same slot). First portion 322 may be determined based on processing capability 326 (e.g., which indicates whether UE 115 has one of at least two capability types: a first processing capability ("capability 1") or a second processing capability ("capability 2")), subcarrier spacing associated with PDSCH 334, and whether one or more additional positions for DMRS symbols are configured. For example, UE 115 may determine first portion 322 based on a mapping of processing capability 326, the subcarrier spacing associated with PDSCH 334, and whether the one or more additional positions for DMRS symbols are configured that is specified in a wireless communication standard (e.g., a 3GPP wireless communication standard). The mappings are described above in Table 1 and Table 2.

Determining second portion 324 (e.g., $d_{1,1}$) is not the same when there are multiple transmission occasions within PDSCH 334. However, in order to explain the determination of second portion 324 for multiple transmission occasions, it is helpful to first describe determining a portion (e.g., $d_{1,1}$) of an overall processing time for a PDSCH that includes a single transmission occasion. When a mapping type of a transmission occasion is the first mapping type (e.g., mapping type A), a processing time (e.g., $d_{1,1}$) corresponding to the transmission occasion is determined based on a last symbol of the transmission occasion. For example, the last symbol of the transmission occasion may be designated the i-th symbol. If i is less than 7, the processing time is equal to 7−i symbols. If i is greater than or equal to 7, the processing time is equal to 0 symbols.

When the mapping type of the transmission occasion is the second mapping type (e.g., mapping type B), the processing time (e.g., $d_{1,1}$) is determined based on the UE processing capability of the UE. When the processing capability is a first capability type (e.g., processing capability 1), the processing time is determined based on a length of the transmission occasion or a number of symbols of the DCI that overlap the transmission occasion. To illustrate, when the length of the transmission occasion is greater than or equal to 7, the processing time is equal to 0 symbols. When the length (e.g., L) of the transmission occasion is between 4 and 6 symbols, the processing time is equal to 7−L. When the length of the transmission occasion is equal to 3 symbols, the processing time is equal to 3+min(d, 1), where d is the number of symbols of the DCI that overlap the transmission occasion. When the length of the transmission occasion is equal to 2 symbols, the processing time is equal to 3+d.

Alternatively, when the mapping type of the transmission occasion is the second mapping type (e.g., mapping type B) and the processing capability is the second capability type (e.g., processing capability 2), the processing time is determined based on a length of the transmission occasion, a number of symbols of the DCI that overlap the transmission occasion, or a number of symbols of a control resource set (CORESET) corresponding to the DCI. To illustrate, when the length of the transmission occasion is greater than or equal to 7 symbols, the processing time is equal to 0 symbols. When the length of the transmission occasion is between 3 and 6 symbols, the processing time is equal to d, where d is the number of symbols of the DCI that overlap the transmission occasion. When the length of the transmission occasion is equal to 2 symbols, if the number of symbols of the CORESET is equal to 3 (e.g., a 3-symbol CORESET) and the DCI and the transmission occasion have the same starting symbol, the processing time is equal to 3 symbols. Otherwise, when the length of the transmission occasion is equal to 2 symbols (e.g., if the CORESET is not a 3-symbol CORESET or the DCI and the transmission occasion do not share the same starting symbol), the processing time is equal to d.

Figure 5:
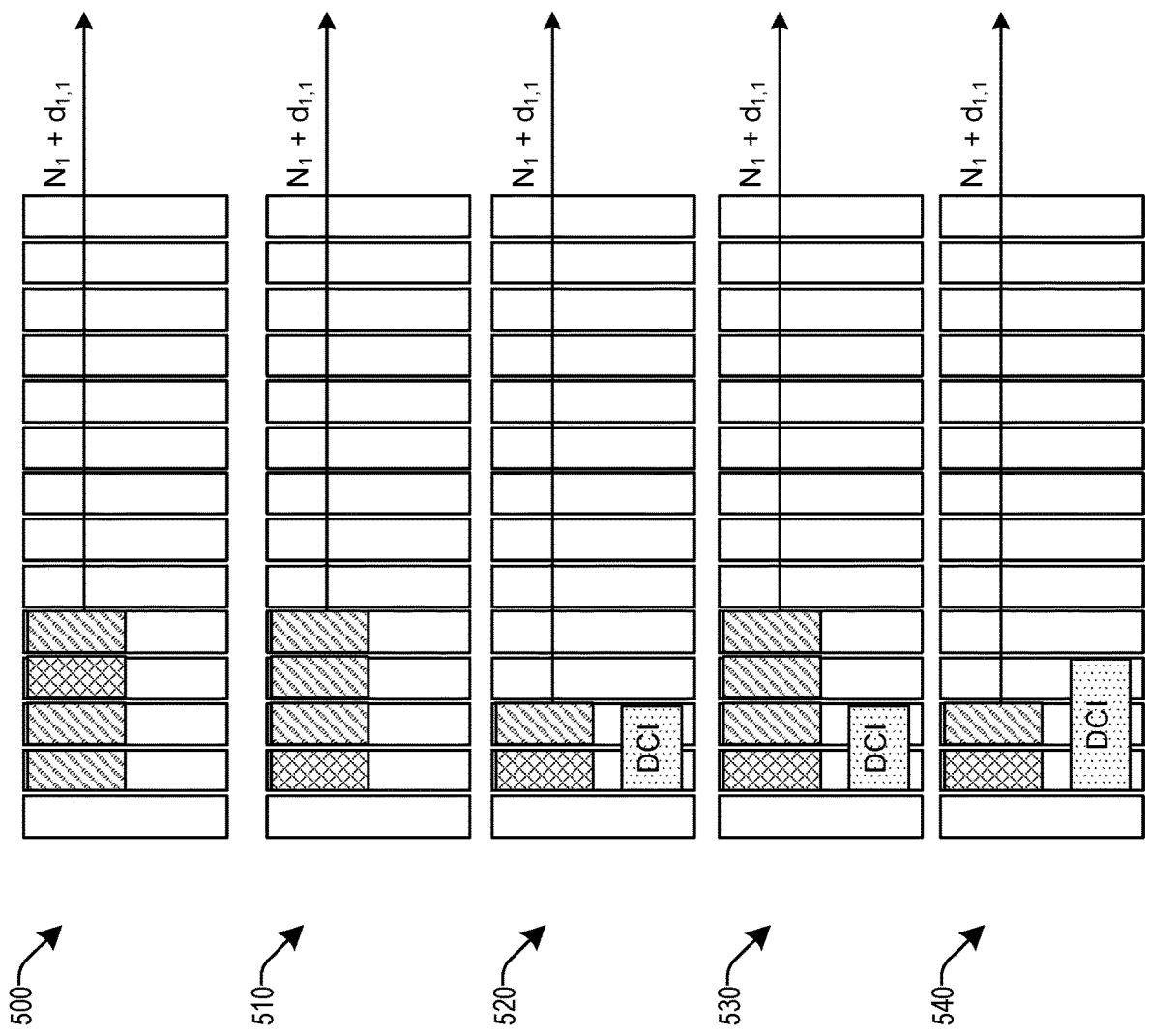
FIG. 5 illustrates various examples of determining a portion of a processing time at a UE based on a PDSCH with a single transmission occasion.

FIG. 5 illustrates examples of determining a processing time of a PDSCH that includes a single transmission occasion. In a first example 500, the PDSCH starts at the second symbol, has a length of 4 symbols, and ends at the fifth symbol. In first example 500, the PDSCH corresponds to the first mapping type (e.g., because the DMRS symbol is not the first symbol of the PDSCH). In the first example, i (e.g., the last symbol of the PDSCH) is equal to 5. Because 5<7, the processing time (e.g., is equal to 7−5=2 symbols.

In a second example 510, the PDSCH corresponds to the second mapping type (e.g., because the DMRS symbol is the first symbol of the PDSCH) and the UE capability corresponds to the first capability type. In second example 510, the PDSCH starts at the second symbol, has a length (L) of 4 symbols, and ends at the fifth symbol. Because L is between 4 and 6, the processing time (e.g., is equal to 7−L=7−4=3 symbols.

In a third example 520, the PDSCH corresponds to the second mapping type and the UE capability corresponds to the first capability type. In third example 520, the PDSCH starts at the second symbol, has a length (L) of 2 symbols, and ends at the third symbol. Additionally, 2 symbols of the DCI overlap the PDSCH (e.g., the DCI is also located at the second and third symbols). Because L=2, the processing time (e.g., is equal to 3+d=3+2=5 symbols.

In a fourth example 530, the PDSCH corresponds to the second mapping type and the UE capability corresponds to the second capability type. In fourth example 530, the PDSCH starts at the second symbols, has a length (L) of 4 symbols, and ends at the fifth symbol. Additionally, 2 symbols of the DCI overlap the PDSCH. Because L is between 3 and 6, the processing time (e.g., $d_{1,1}$) is equal to d=2 symbols.

In a fifth example 540, the PDSCH corresponds to the second mapping type and the UE capability corresponds to the second capability type. In fifth example 540, the PDSCH starts at the second symbol, has a length (L) of 2 symbols, and ends at the third symbol. Additionally, the DCI is a 3-symbol CORESET (e.g., includes 3 symbols) and the DCI and the PDSCH start at the same symbol (e.g., the second symbol). Because the DCI is the 3-symbol CORESET and the DCI and the PDSCH start at the same symbol, the processing time (e.g., $d_{1,1}$) is equal to 3 symbols.

Returning to FIG. 3, UE 115 determines overall processing time 320 based on a sum of first portion 322 and second portion 324. First portion 322 is determined as described above. Second portion 324 (e.g., $d_{1,1}$) is determined based on a mapping type of first transmission occasion 348, a mapping type of second transmission occasion 349, processing capability 326, a length of first transmission occasion 348, a length of second transmission occasion 349, a number of symbols of DCI 330 that overlap first transmission occasion 348, a number of symbols of DCI 330 that overlap second transmission occasion 349, symbol offset 346, or a combination thereof. In some implementations, the mapping type of first transmission occasion 348 is indicated by mapping type 342, and the mapping type of second transmission occasion 349 is always the second mapping type (e.g., mapping type B). In some other implementations, both mapping types are always the second mapping type. In other implementations, the mapping types may have other values. Determining second portion 324 in such a manner corresponds to determining second portion 324 based on a processing time corresponding to first transmission occasion 348, a processing time corresponding to second transmission occasion 349, other information, or a combination thereof.

Second portion 324 (e.g., $d_{1,1}$) may be determined according to a variety of alternatives or rules. In some implementations (e.g., a first alternative/rule), UE 115 determines a first processing time corresponding to first transmission occasion 348 and a second processing time corresponding to second transmission occasion 349. For example, the first processing time may be determined as described above as if first transmission occasion 348 was the only transmission occasion, and the second processing time may be determined as described above as if second transmission occasion 349 was the only transmission occasion. In these implementations, second portion 324 is equal to a maximum of the first processing time and the second processing time.

In some other implementations (e.g., a second alternative/rule), UE 115 determines a difference between the first processing time corresponding to first transmission occasion 348 and symbol offset 346. UE 115 also determines the second processing time corresponding to second transmission occasion 349. In these implementations, second portion 324 is equal to a maximum of the difference (e.g., between the first processing time and symbol offset 346) and the second processing time.

In some other implementations (e.g., a third alternative/rule), UE 115 determines a processing time corresponding to second transmission occasion 349, and second portion 324 is equal to the processing time corresponding to second transmission occasion 349. In some other implementations (e.g., a fourth alternative/rule), UE 115 determines a processing time corresponding to first transmission occasion 348, and second portion 324 is equal to the processing time corresponding to first transmission occasion 348. Alternatively, second portion 324 may be equal to a difference between the processing time corresponding to first transmission occasion 348 and symbol offset 346.

In some other implementations (e.g., a fifth alternative/rule), UE 115 determines a combined processing time corresponding to a combination of first transmission occasion 348 and second transmission occasion 349. The combined processing time is determined based on a combined length of first transmission occasion 348 and second transmission occasion 349. Second portion 324 is equal to the combined processing time. In some implementations, symbol offset 346 is included in the combined length (e.g., the combined length is the sum of the length of first transmission occasion 348, symbol offset 346, and second transmission occasion 349). In some other implementations, symbol offset 346 is excluded from the combined length (e.g., the combined length is the sum of the length of first transmission occasion 348 and the length of second transmission occasion 349, and symbol offset 346 is ignored). The mapping type for the combination may be based on the mapping type of first transmission occasion 348, the mapping type of second transmission occasion 349, or both. For example, if the mapping types of both transmission occasions are the same, the mapping type for the combination is the mapping type of either transmission occasion. In some implementations, if the mapping types of the transmission occasions are different, the combined transmit time is determined based on the mapping type of first transmission occasion 348. Alternatively, if the mapping types of the transmission occasions are different, the combined transmit time may be determined based on the mapping type of second transmission occasion 349.

In some other implementations (e.g., a sixth alternative/rule), UE 115 determines a processing time corresponding to second transmission occasion 349. However, in this determination, UE 115 uses the number of symbols of DCI 330 that overlap either first transmission occasion 348 or second transmission occasion 349 (e.g., that overlap any part of PDSCH 334). Second portion 324 is equal to the processing time corresponding to second transmission occasion 349 (determined with all overlapping DCI symbols).

Figure 6:
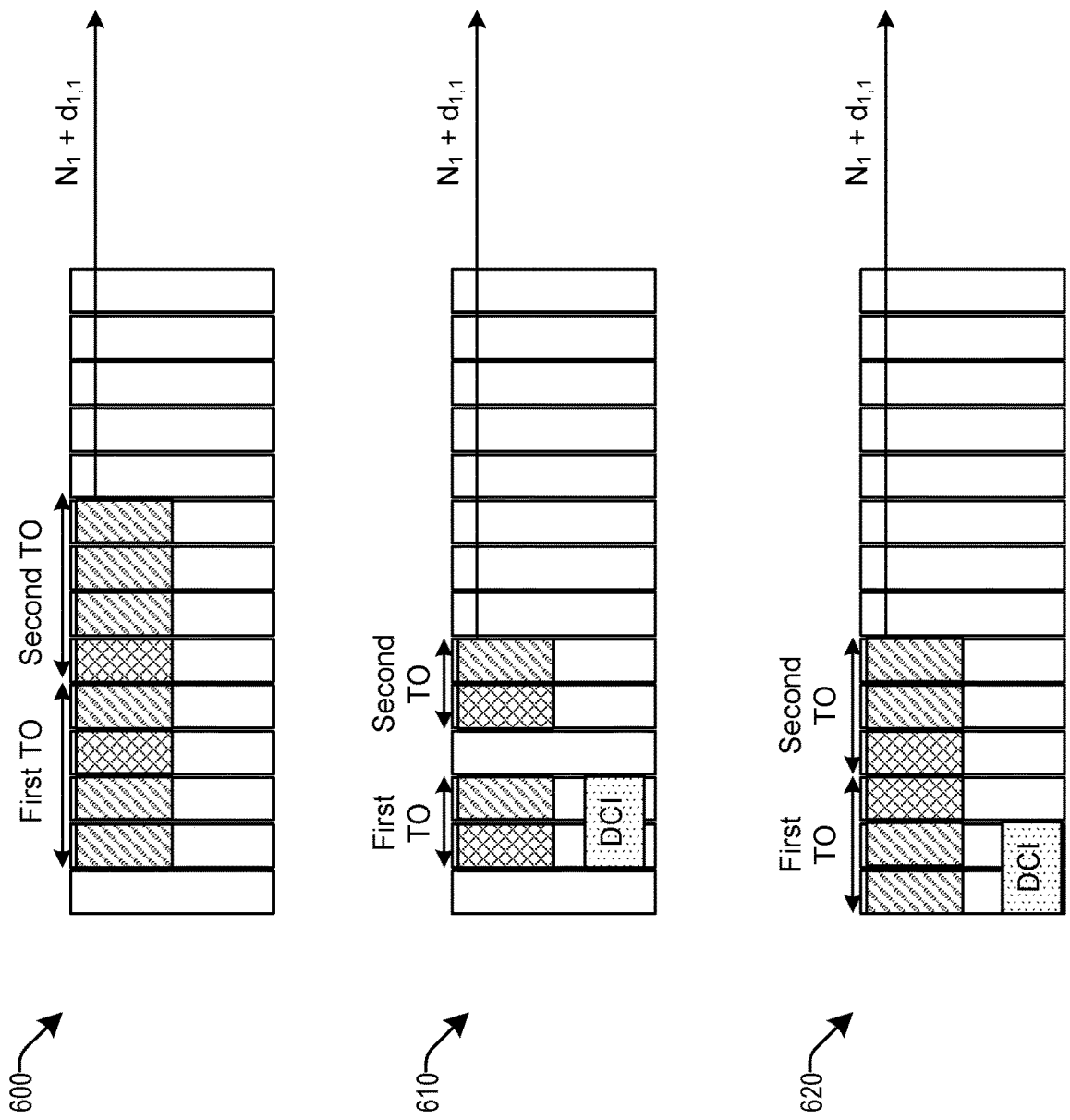
FIG. 6 illustrates various examples of determining a portion of a processing time at a UE based on a PDSCH with multiple transmission occasions.

FIG. 6 illustrates examples of determining a portion of an overall processing time (e.g., $d_{1,1}$) for PDSCHs that include two transmission occasions. In a first example 600, a first transmission occasion corresponds to the first mapping type (e.g., mapping type A). The UE corresponds to the first processing capability type (e.g., processing capability 1).

The first transmission occasion starts at the second symbol, has a length of 4 symbols, and ends at the fifth symbol. In first example 600, a second transmission occasion corresponds to the second mapping type (e.g., mapping type B). The second transmission occasion starts at the sixth symbol, has a length of 4 symbols, and ends at the ninth symbol. In first example 600, the symbol offset is 0 (or is not configured).

Based on the description above, the processing time of the first transmission occasion is equal to 7−i=7−5=2 symbols. Based on the description above, the processing time of the second transmission occasion is equal to 7−L=7−4=3 symbols. For the first alternative, second portion 324 (e.g. $d_{1,1}$) is equal to max(2, 3)=3 symbols. For the second alternative, second portion 324 is equal to max (2−0, 3)=max(2,3)=3 symbols. For the third alternative, second portion 324 is equal to 3 symbols (e.g., the processing time of the second transmission occasion). For the fourth alternative, second portion 324 is equal to 2 symbols (e.g., the processing time of the first transmission occasion). For the fifth alternative, the combined length is equal to 8 symbols and, if the mapping type of the combination is the mapping type of the first transmission occasion (e.g., the first mapping type), L is greater than or equal to 7 symbols, resulting in second portion 324 being equal to 0 symbols. In the sixth implementation, second portion 324 is equal to 3 symbols (e.g., the processing time of the second transmission occasion with no modifications because there is no overlap of a DCI with either transmission occasion).

In a second example 610, a first transmission occasion corresponds to the second mapping type (e.g., mapping type B). The UE corresponds to the first processing capability type (e.g., processing capability 1). The first transmission occasion starts at the second symbol, has a length of 2 symbols, and ends at the third symbol. In second example 610, a second transmission occasion corresponds to the second mapping type. The second transmission occasion starts at the fifth symbol, has a length of 2 symbols, and ends at the sixth symbol. In second example 610, the symbol offset is 1 symbol. A DCI overlaps both symbols of the first transmission occasion.

Based on the description above, the processing time of the first transmission occasion is equal to 3+d=3+2=5 symbols. The processing time of the second transmission occasion is 3+d=3+0=3 symbols. For the first alternative, second portion 324 (e.g., $d_{1,1}$) is equal to max(5,3)=5 symbols. For the second alternative, second portion 324 is equal to max(5−1,3)=max(4,3)=4 symbols. For the third alternative, second portion 324 is equal to 3 symbols. For the fourth alternative, second portion 324 is equal to 5 symbols. For the fifth alternative, the combined length is equal to 4 symbols (excluding the symbol offset) and the mapping type is the second mapping type. Thus, because L is between 4 and 6 symbols, second portion 324 is equal to 7−L=7−4=3 symbols. For the sixth alternative, the number of overlapping symbols of the DCI and the entirety of the PDSCH is 2 symbols, the length is 2, and second portion 324 is equal to 3+d=3+2=5 symbols.

In a third example 620, a first transmission occasion corresponds to the first mapping type (e.g., mapping type A). The UE corresponds to the second processing capability type (e.g., processing capability 2). The first transmission occasion starts at the first symbol, has a length of 3 symbols, and ends at the third symbol. In third example 620, a second transmission occasion corresponds to the second mapping type (e.g., mapping type B). The second transmission occasion starts at the fourth symbol, has a length of 3 symbols, and ends at the sixth symbol. In third example 620, the symbol offset is 0 symbols (or is not configured). A DCI overlaps 2 symbols of the first transmission occasion.

Based on the description above, the processing time of the first transmission occasion, because i is <7, is equal to 7−i=7−3=4 symbols. The processing time of the second transmission occasion, because L is between 3 and 6 symbols, is equal to d=0 symbols (because the DCI does not overlap any symbols of the second transmission occasion. For the first alternative, second portion 324 (e.g., $d_{1,1}$) is equal to max(4,0)=4 symbols. For the second alternative, second portion 324 is equal to max(4−0,0)=max(4,0)=4 symbols. For the third alternative, second portion 324 is equal to 0 symbols. For the fourth alternative, second portion 324 is equal to 4 symbols. For the fifth alternative, the combined length is 6 symbols, the mapping type is the first mapping type, and the combination ends on the sixth symbol. Thus, second portion 324=7−i=7−6=1 symbol. For the sixth alternative, the number of overlapping symbols of the DCI and the entirety of the PDSCH is 2, L is equal to 3 symbols (e.g., between 3 and 6), and second portion 324=d=2 symbols.

Returning to FIG. 3, after determining second portion 324, UE 115 may determine overall processing time 320 by summing first portion 322 and second portion 324. After decoding PDSCH 334, UE 115 may generate HARQ-ACK 336 responsive to the TBs received via PDSCH 334. UE 115 may transmit, to base station 105, HARQ-ACK 336 at a time after PDSCH 334 that is greater than or equal to overall processing time 320. HARQ-ACK 336 may be transmitted via a physical uplink control channel (PUCCH). Thus, overall processing time 320 indicates the minimum number of symbols between the final symbol of PDSCH 334 (e.g., of second transmission occasion 349) and the first symbol of HARQ-ACK 336.

UE 115 may determine second portion 324 based on one or more of the rules (e.g., alternatives) described above. In some implementations, UE 115 determines second portion 324 based on a particular rule (e.g., alternative) that is preprogrammed at UE 115 prior to deployment or release of UE 115. In some such implementations, the rule may be specified by a wireless communication standard (e.g., a 3GPP wireless communication standard). In some other implementations, a rule for determining second portion 324 may be specified by the network. For example, the rule may be specified in a master information block (MIB) and may be static within wireless communications system 300. Alternatively, the rule may be dynamically specified via RRC signaling or MAC CEs. In still other implementations, UE 115 may be preprogrammed with a plurality of rules, and a particular rule (of the six above-described alternatives/rules) for determining second portion 324 may be selected at UE 115, such as based on characteristics of DCI 330 or PDSCH 334.

Although the determination of overall processing time 320 has been described as being performed by UE 115, base station 105 may also determine overall processing time 320. To illustrate, much of the information used to determine overall processing time 320, such as mapping type 342, transmission occasion information 344, and symbol offset 346 either originates at or is known to base station 105. Additionally, UE 115 may share processing capability 326 with base station 105 during an association process. Thus, base station 105, after transmitting DCI 330, may determine overall processing time 320 in the same manner as UE 115. Base station 105 may schedule UE 105 to transmit HARQ- ACK 336 at a time after PDSCH 334 (e.g., second transmission occasion 349) that is greater than or equal to overall processing time 320.

Thus, FIG. 3 describes wireless communications system 300 that enables PDSCH repetition in a single slot without causing problems to scheduling of HARQ-ACK 336. For example, even though DCI 330 indicates two TCI states and PDSCH therefore includes two transmission occasions, UE 115 and/or base station 105 is able to determine overall processing time 320 according to one or more rules (e.g., alternatives) described herein. Thus, scheduling of transmission of HARQ-ACK 336 may be sufficiently delayed to give UE 115 time to decode first transmission occasion 348 and perform soft combining on both transmission occasions as part of processing PDSCH 334.

Figure 9:
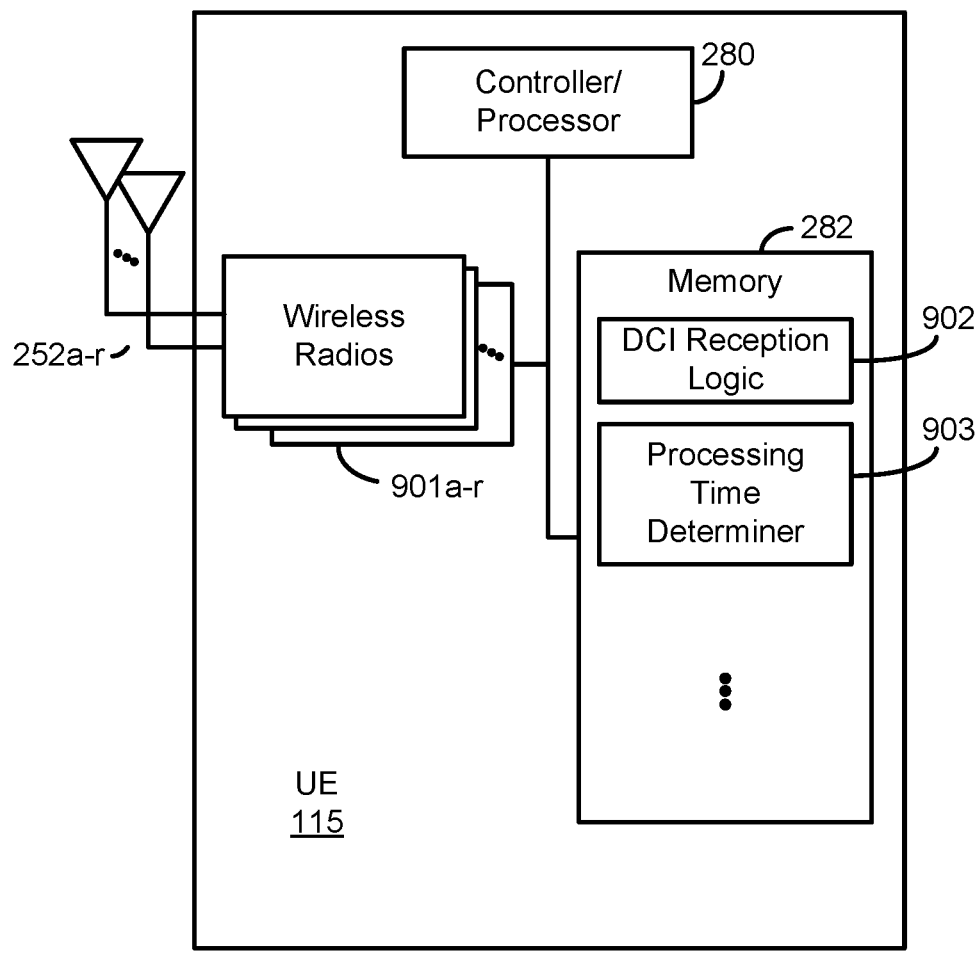
FIG. 9 is a block diagram conceptually illustrating a design of a UE configured to determine an overall processing time based on a PDSCH including two transmission occasions according to some aspects.

FIG. 7 is a flow diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266.

At block 700, the UE receives, from a base station, a DCI scheduling a PDSCH. The PDSCH includes a first transmission occasion and a second transmission occasion following the first transmission occasion during a single slot. The UE 115 may execute, under control of controller/processor 280, DCI reception logic 902 stored in memory 282. The execution environment of DCI reception logic 902 provides the functionality to receive, from a base station, a DCI scheduling a PDSCH. The PDSCH includes a first transmission occasion and a second transmission occasion following the first transmission occasion during a single slot. In some implementations, the DCI indicates two TCI states within a single slot.

At block 701, the UE determines an overall processing time following a last symbol of the PDSCH. The UE 115 may execute, under control of controller/processor 280, processing time determiner 903 stored in memory 282. The execution environment of processing time determiner 903 provides the functionality to determine an overall processing time following a last symbol of the PDSCH. A portion of the overall processing time may be determined based on a mapping type of a first transmission occasion of the PDSCH, a mapping type of a second transmission occasion of the PDSCH, a processing capability of UE 115, a length of the first transmission occasion, a length of the second transmission occasion, a number of symbols of the DCI that overlap the first transmission occasion, a number of symbols of the DCI that overlap the second transmission occasion, a symbol offset between the first transmission occasion and the second transmission occasion, or a combination thereof. For example, UE 115 may determine the portion of the overall processing time according to one or more of the six rules (e.g., alternatives) described above.

Figure 10:
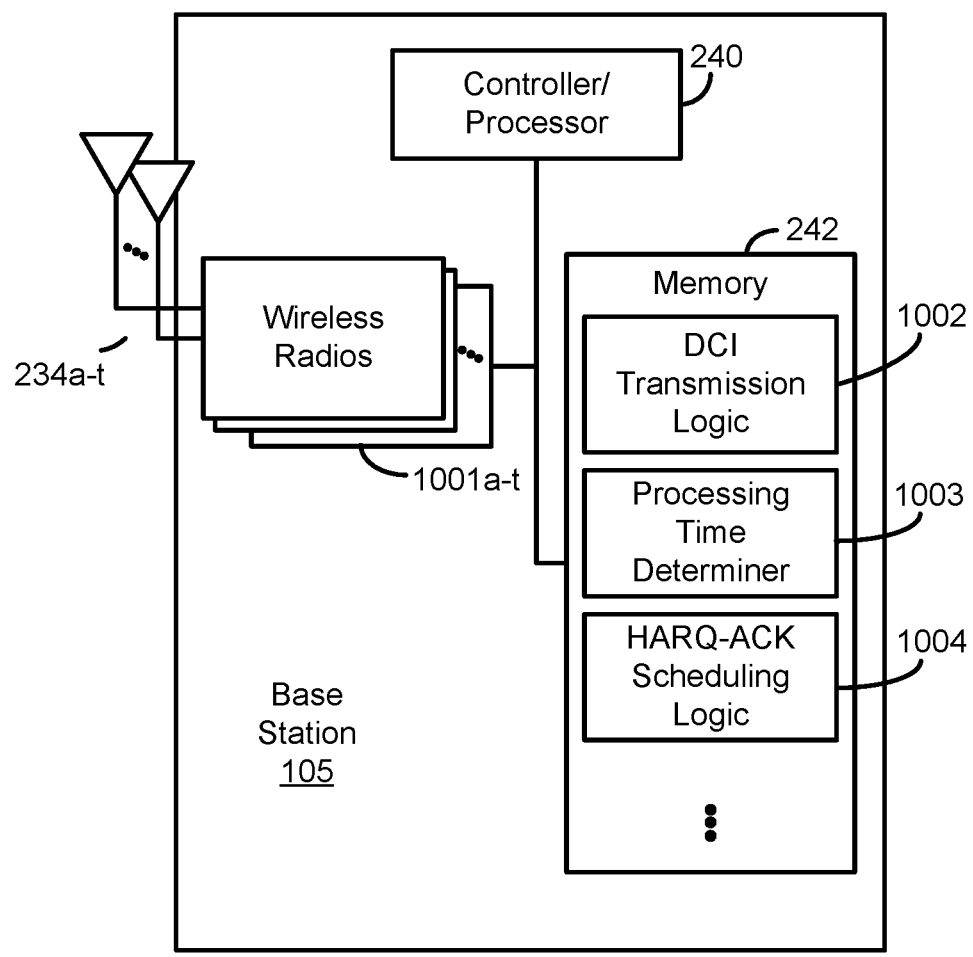
FIG. 10 is a block diagram conceptually illustrating a design of a base station configured to determine an overall processing time at a UE based on a PDSCH including two transmission occasions according to some aspects.

FIG. 8 is a flow diagram illustrating example blocks executed to implement one aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t includes various components and hardware, as illustrated in FIG. 2 for base station 105, including modulator/demodulators 232a-t, MIMO detector 236, receive processor 238, transmit processor 220, and TX MIMO processor 230.

At block 800, the base station transmits, to a UE, a DCI scheduling a PDSCH. The PDSCH including a first transmission occasion and a second transmission occasion following the first transmission occasion during a single slot. The base station 105 may execute, under control of controller/processor 240, DCI transmission logic 1002 stored in memory 242. The execution environment of DCI transmission logic 1002 provides the functionality to transmits, to a UE, a DCI scheduling a PDSCH. The PDSCH including a first transmission occasion and a second transmission occasion following the first transmission occasion during a single slot. In some implementations, the DCI indicates two TCI states within a single slot.

At block 801, the base station determines an overall processing time of the UE following a last symbol of the PDSCH. The base station 105 may execute, under control of controller/processor 240, processing time determiner 1003 stored in memory 242. The execution environment of processing time determiner 1003 provides the functionality to determine an overall processing time of the UE following a last symbol of the PDSCH. A portion of the overall processing time may be determined based on a mapping type of a first transmission occasion of the PDSCH, a mapping type of a second transmission occasion of the PDSCH, a processing capability of the UE, a length of the first transmission occasion, a length of the second transmission occasion, a number of symbols of the DCI that overlap the first transmission occasion, a number of symbols of the DCI that overlap the second transmission occasion, a symbol offset between the first transmission occasion and the second transmission occasion, or a combination thereof. For example, base station 105 may determine the portion of the overall processing time according to one or more of the six rules (e.g., alternatives) described above.

At block 802, the base station schedules a HARQ-ACK from the UE at a time after the PDSCH that is greater than or equal to the overall processing time. The base station 105 may execute, under control of controller/processor 240, HARQ-ACK scheduling logic 1004 stored in memory 242. The execution environment of HARQ-ACK scheduling logic 1004 provides the functionality to schedule a HARQ-ACK from the UE at a time after the PDSCH that is greater than or equal to the overall processing time.

In some aspects, techniques for supporting PDSCH repetition in the same slot or consecutive slots may include additional aspects, such as any single aspect or any combination of aspects described below or in connection with one or more other processes or devices described elsewhere herein. In a first aspect, techniques for supporting PDSCH repetition in the same slot or consecutive slots may include receiving, at a UE from a base station, a DCI scheduling a PDSCH. The PDSCH includes a first transmission occasion and a second transmission occasion following the first transmission occasion during a single slot. The techniques of the first aspect may further include determining, at the UE, an overall processing time following a last symbol of the PDSCH. In some examples, the techniques of the first aspect may be implemented in a method or process. In some other examples, the techniques of the first aspect may be implemented in a wireless communication device such as a UE or a component of a UE. In some examples, the wireless communication device may include at least one processor, processing unit, or system (which may include an application processor, a modem or other components) and at least one memory or memory device coupled to the processor. The processor may be configured to perform operations described herein with respect to the wireless communication device. In some examples, the memory includes a non-transitory computer-readable medium having program code stored thereon that, when executed by the processing unit, is configured to cause the wireless communication device to perform the operations described herein. In some examples, the techniques of the first aspect may be implemented in an apparatus that includes one or more means configured to perform the operations described herein.

In a second aspect, in combination with the first aspect, the overall processing time follows a last symbol of the second transmission occasion.

In a third aspect, in combination with one or more of the first through second aspects, the techniques of the third aspect include determining a processing time corresponding to the first transmission occasion. The overall processing time includes a first portion of processing time and a second portion of processing time. The second portion of processing time is the processing time corresponding to the first transmission occasion.

In a fourth aspect, in combination with the third aspect, when a mapping type of the first transmission occasion is a second mapping type of at least two mapping types and a processing capability of the UE is a first capability type of at least two capability types. The processing time is determined based on a length of the first transmission occasion.

In a fifth aspect, in combination with the fourth aspect, when the length of the first transmission occasion is greater than or equal to seven symbols, the processing time is equal to zero symbols. When the length of the first transmission occasion is between four and six symbols, the processing time is equal to seven symbols minus the length of the first transmission occasion. When the length of the first transmission occasion is equal to three symbols, the processing time is equal to three symbols plus a minimum of d and one. d is a number of symbols of the DCI that overlap the first transmission occasion. When the length of the first transmission occasion is equal to two symbols, the processing time is equal to three symbols plus d.

In a sixth aspect, in combination with the third aspect, when a mapping type of the first transmission occasion is a second mapping type of at least two mapping types and a processing capability of the UE is a second capability type of at least two capability types, the processing time is determined based on a length of the first transmission occasion, a number of symbols of the DCI that overlap the first transmission occasion, or a number of symbols of a control resource set (CORESET) corresponding to the DCI.

In a seventh aspect, in combination with the sixth aspect, when the length of the first transmission occasion is greater than or equal to seven symbols, the processing time is equal to zero symbols. When the length of the first transmission occasion is between three and six symbols, the processing time is equal to the number of symbols of the DCI that overlap the first transmission occasion. When the length of the first transmission occasion is equal to two symbols, the number of symbols of the CORESET is equal to three symbols, and the DCI and the first transmission occasion have the same starting symbol, the processing time is equal to three symbols. When the length of the first transmission occasion is equal to two symbols and the number of symbols of the CORESET is not equal to three symbols or the DCI and the first transmission occasion do not have the same starting symbol, the processing time is equal to the number of symbols of the DCI that overlap the first transmission occasion.

In an eighth aspect, in combination with one or more of the first through seventh aspects, the techniques of the eighth aspect include generating, at the UE, a HARQ-ACK, and transmitting, from the UE to the base station, the HARQ-ACK at a time after the PDSCH that is greater than or equal to the overall processing time.

In a ninth aspect, in combination with one or more of the first, second, or eighth aspects, the overall processing time includes a first portion of processing time and a second portion of processing time. The second portion of processing time is determined based on a mapping type of a first transmission occasion of the PDSCH, a mapping type of a second transmission occasion of the PDSCH, a processing capability of the UE, a length of the first transmission occasion, a length of the second transmission occasion, a number of symbols of the DCI that overlap the first transmission occasion, a number of symbols of the DCI that overlap the second transmission occasion, a symbol offset between the first transmission occasion and the second transmission occasion, or a combination thereof.

In a tenth aspect, in combination with the ninth aspect, the symbol offset is RRC configurable.

In an eleventh aspect, in combination with the ninth aspect, the techniques of the eleventh aspect include determining a first processing time corresponding to the first transmission occasion and determining a second processing time corresponding to the second transmission occasion. The second portion of processing time is a maximum of the first processing time and the second processing time.

In a twelfth aspect, in combination with the eleventh aspect, when the mapping type of the first transmission occasion is a first mapping type of at least two mapping types, the first processing time is determined based on a last symbol of the first transmission occasion. The last symbol of the first transmission occasion is the i-th symbol. When i is less than seven symbols, the first processing time is equal to 7 symbols−i, and when i is greater than or equal to seven symbols, the first processing time is equal to zero symbols.

In a thirteenth aspect, in combination with the ninth aspect, the techniques of the thirteenth aspect include determining a difference between a first processing time corresponding to the first transmission occasion and the symbol offset, and determining a second processing time corresponding to the second transmission occasion. The second portion of processing time is a maximum of the difference and the second processing time.

In a fourteenth aspect, in combination with the ninth aspect, the techniques of the fourteenth aspect include determining a processing time corresponding to the second transmission occasion. The second portion of processing time is the processing time corresponding to the second transmission occasion.

In a fifteenth aspect, in combination with the ninth aspect, the techniques of the fifteenth aspect include determining a processing time corresponding to the first transmission occasion. The second portion of processing time is the processing time corresponding to the first transmission occasion or a difference between the processing time corresponding to the first transmission occasion and the symbol offset.

In a sixteenth aspect, in combination with the ninth aspect, the techniques of the sixteenth aspect include determining a combined processing time corresponding to a combination of the first transmission occasion and the second transmission occasion. The combined processing time is determined based on a combined length of the first transmission occasion and the second transmission occasion.

In a seventeenth aspect, in combination with the sixteenth aspect, the combined length includes the symbol offset.

In an eighteenth aspect, in combination with the sixteenth aspect, the combined length excludes the symbol offset.

In a nineteenth aspect, in combination with one or more of the first through eighteenth aspects, the DCI indicates two TCI states within the single slot.

In a twentieth aspect, in combination with one or more of the first, second, eighth, and nineteenth aspects, the overall processing time includes a first portion of processing time and a second portion of processing time. The first portion of processing time is determined based on a processing capability of the UE, subcarrier spacing associated with the PDSCH, and whether one or more additional positions for DMRS symbols are configured.

In a twenty-first aspect, in combination with the twentieth aspect, the techniques of the twenty-first aspect include determining, at the UE, the first portion of processing time based on a mapping of the processing capability of the UE, the subcarrier spacing associated with the PDSCH, and whether the one or more additional positions for DMRS symbols are configured that is specified in a wireless communication standard.

In a twenty-second aspect, techniques for supporting PDSCH repetition in the same slot or consecutive slots may include transmitting, from a base station to a UE, a DCI scheduling a PDSCH. The PDSCH includes a first transmission occasion and a second transmission occasion following the first transmission occasion during a single slot. The techniques of the twenty-second aspect may also include determining, at the base station, an overall processing time of the UE following a last symbol of the PDSCH. The techniques of the twenty-second aspect may further include scheduling a HARQ-ACK from the UE at a time after the PDSCH that is greater than or equal to the overall processing time. In some examples, the techniques of the twenty-second aspect may be implemented in a method or process. In some other examples, the techniques of the twenty-second aspect may be implemented in a wireless communication device such as a base station or a component of a base station. In some examples, the wireless communication device may include at least one processor, processing unit, or system (which may include an application processor, a modem or other components) and at least one memory or memory device coupled to the processor. The processor may be configured to perform operations described herein with respect to the wireless communication device. In some examples, the memory includes a non-transitory computer-readable medium having program code stored thereon that, when executed by the processing unit, is configured to cause the wireless communication device to perform the operations described herein. In some examples, the techniques of the twenty-second aspect may be implemented in an apparatus that includes one or more means configured to perform the operations described herein.

In a twenty-third aspect, in combination with the twenty-second aspect, the overall processing time includes a first portion of processing time and a second portion of processing time. The second portion of processing time is determined based on a mapping type of a first transmission occasion of the PDSCH, a mapping type of a second transmission occasion of the PDSCH, a processing capability of the UE, a length of the first transmission occasion, a length of the second transmission occasion, a number of symbols of the DCI that overlap the first transmission occasion, a number of symbols of the DCI that overlap the second transmission occasion, a symbol offset between the first transmission occasion and the second transmission occasion, or a combination thereof.

In a twenty-fourth aspect, in combination with the twenty-third aspect, the DCI indicates two transmission configuration indicator (TCI) states within the single slot.

In a twenty-fifth aspect, in combination with one or more of the twenty-third through twenty-fourth aspects, determining a processing time corresponding to the first transmission occasion. The overall processing time includes a first portion of processing time and a second portion of processing time. The second portion of processing time is the processing time corresponding to the first transmission occasion.

In a twenty-sixth aspect, in combination with twenty-fifth aspect, a mapping type of the first transmission occasion is a second mapping type of at least two mapping types and a processing capability of the UE is a first capability type of at least two capability types, the processing time is determined based on a length of the first transmission occasion.

In a twenty-seventh aspect, in combination with the twenty-sixth aspect, when a length of the first transmission occasion is greater than or equal to seven symbols, the processing time is equal to zero symbols. When the length of the first transmission occasion is between four and six symbols, the processing time is equal to seven symbols minus the length of the first transmission occasion. When the length of the first transmission occasion is equal to three symbols, the processing time is equal to three symbols plus a minimum of d and one. d is a number of symbols of the DCI that overlap the first transmission occasion. When the length of the first transmission occasion is equal to two symbols, the processing time is equal to three symbols plus d.

In a twenty-eighth aspect, in combination with one or more of the twenty-third through twenty-fourth aspects, the techniques of the twenty-eighth aspect include determining a combined processing time corresponding to a combination of the first transmission occasion and the second transmission occasion. The combined processing time is determined based on a combined length of the first transmission occasion and the second transmission occasion.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, etc., or any combination thereof. In addition, features discussed herein relating to FIGS. 1-10 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor (e.g., directly, after compilation/conversion/interpretation, etc.), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled (e.g., communicatively, operatively, electronically, or otherwise) to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   receiving, at a user equipment (UE) from a wireless communication device, a downlink control information (DCI) scheduling a physical downlink shared channel (PDSCH), the PDSCH including a first transmission occasion and a second transmission occasion following the first transmission occasion during a single slot;

determining, at the UE, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion; and determining, at the UE, an overall processing time following a last symbol of the PDSCH, wherein the overall processing time comprises a first portion of processing time and a second portion of processing time, and wherein the second portion of processing time is the processing time corresponding to the first transmission occasion.

2. The method of claim 1, wherein the overall processing time follows a last symbol of the second transmission occasion.

3. The method of claim 1, wherein:
when the length of the first transmission occasion is greater than or equal to seven symbols, the processing time is equal to zero symbols;
when the length of the first transmission occasion is between four and six symbols, the processing time is equal to seven symbols minus the length of the first transmission occasion;
when the length of the first transmission occasion is equal to three symbols, the processing time is equal to three symbols plus a minimum of d and one, d being a number of symbols of the DCI that overlap the first transmission occasion; and
when the length of the first transmission occasion is equal to two symbols, the processing time is equal to three symbols plus d.

4. A method of wireless communication, the method comprising:
receiving, at a user equipment (UE) from a wireless communication device, a downlink control information (DCI) scheduling a physical downlink shared channel (PDSCH), the PDSCH including a first transmission occasion and a second transmission occasion following the first transmission occasion during a single slot;
determining, at the UE, a processing time corresponding to the first transmission occasion, wherein, when a mapping type of the first transmission occasion is a second mapping type of at least two mapping types and a processing capability of the UE is a second capability type of at least two capability types, the processing time is determined based on a length of the first transmission occasion, a number of symbols of the DCI that overlap the first transmission occasion, or a number of symbols of a control resource set (CORESET) corresponding to the DCI; and
determining, at the UE, an overall processing time following a last symbol of the PDSCH, wherein the overall processing time comprises a first portion of processing time and a second portion of processing time, and wherein the second portion of processing time is the processing time corresponding to the first transmission occasion.

5. The method of claim 4, wherein:
when the length of the first transmission occasion is greater than or equal to seven symbols, the processing time is equal to zero symbols;
when the length of the first transmission occasion is between three and six symbols, the processing time is equal to the number of symbols of the DCI that overlap the first transmission occasion;
when the length of the first transmission occasion is equal to two symbols, the number of symbols of the CORESET is equal to three symbols, and the DCI and the first transmission occasion have the same starting symbol, the processing time is equal to three symbols; and
when the length of the first transmission occasion is equal to two symbols and the number of symbols of the CORESET is not equal to three symbols or the DCI and the first transmission occasion do not have the same starting symbol, the processing time is equal to the number of symbols of the DCI that overlap the first transmission occasion.

6. The method of claim 1, further comprising:
generating, at the UE, a hybrid automatic repeat request acknowledgement (HARQ-ACK); and
transmitting, from the UE to the wireless communication device, the HARQ-ACK at a time after the PDSCH that is greater than or equal to the overall processing time.

7. A method of wireless communication, the method comprising:
receiving, at a user equipment (UE) from a wireless communication device, a downlink control information (DCI) scheduling a physical downlink shared channel (PDSCH), the PDSCH including a first transmission occasion and a second transmission occasion following the first transmission occasion during a single slot; and
determining, at the UE, an overall processing time following a last symbol of the PDSCH,
wherein the overall processing time comprises a first portion of processing time and a second portion of processing time, and wherein the second portion of processing time is determined based on a mapping type of the first transmission occasion of the PDSCH, a mapping type of the second transmission occasion of the PDSCH, a processing capability of the UE, a length of the first transmission occasion, a length of the second transmission occasion, a number of symbols of the DCI that overlap the first transmission occasion, a number of symbols of the DCI that overlap the second transmission occasion, a symbol offset between the first transmission occasion and the second transmission occasion, or a combination thereof, wherein the symbol offset is radio resource control (RRC) configurable.

8. The method of claim 7, further comprising:
determining a first processing time corresponding to the first transmission occasion; and
determining a second processing time corresponding to the second transmission occasion, wherein the second portion of processing time is a maximum of the first processing time and the second processing time.

9. The method of claim 8, wherein, when the mapping type of the first transmission occasion is a first mapping type of at least two mapping types, the first processing time is determined based on a last symbol of the first transmission occasion, wherein the last symbol of the first transmission occasion is the i-th symbol, wherein, when i is less than seven, the first processing time is equal to 7 symbols−i, and wherein, when i is greater than or equal to seven, the first processing time is equal to zero symbols.

10. The method of claim 7, further comprising:
determining a difference between a first processing time corresponding to the first transmission occasion and the symbol offset; and
determining a second processing time corresponding to the second transmission occasion, wherein the second portion of processing time is a maximum of the difference and the second processing time.

11. The method of claim 7, further comprising determining a processing time corresponding to the second transmission occasion, wherein the second portion of processing time is the processing time corresponding to the second transmission occasion.

12. The method of claim 7, further comprising determining a processing time corresponding to the first transmission occasion, wherein the second portion of processing time is the processing time corresponding to a difference between the processing time corresponding to the first transmission occasion and the symbol offset.

13. The method of claim 7, further comprising determining a combined processing time corresponding to a combination of the first transmission occasion and the second transmission occasion, wherein the combined processing time is determined based on a combined length of the first transmission occasion and the second transmission occasion.

14. The method of claim 13, wherein the combined length includes the symbol offset.

15. The method of claim 13, wherein the combined length excludes the symbol offset.

16. An apparatus configured for wireless communication, the apparatus comprising:
at least one processor; and
a memory coupled to the at least one processor, the memory comprising instructions executable by the at least one processor to cause the apparatus to:
receive, at a user equipment (UE) from a wireless communication device, a downlink control information (DCI) scheduling a physical downlink shared channel (PDSCH), the PDSCH including a first transmission occasion and a second transmission occasion following the first transmission occasion during a single slot;
determine, at the UE, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion; and
determine, at the UE, an overall processing time following a last symbol of the PDSCH, wherein the overall processing time comprises a first portion of processing time and a second portion of processing time, and wherein the second portion of processing time is the processing time corresponding to the first transmission occasion.

17. The apparatus of claim 16, wherein the DCI indicates two transmission configuration indicator (TCI) states within the single slot.

18. The apparatus of claim 16, wherein the first portion of processing time is determined based on a processing capability of the UE, subcarrier spacing associated with the PDSCH, and whether one or more additional positions for demodulation reference signal (DMRS) symbols are configured.

19. The apparatus of claim 18, wherein the instructions are further executable by the at least one processor to cause the apparatus to determine, at the UE, the first portion of processing time based on a mapping of the processing capability of the UE, the subcarrier spacing associated with the PDSCH, and whether the one or more additional positions for DMRS symbols are configured that is specified in a wireless communication standard.

20. An apparatus configured for wireless communication, the apparatus comprising:
means for receiving, at a user equipment (UE), a downlink control information (DCI) from a wireless communication device, the DCI scheduling a physical downlink shared channel (PDSCH), the PDSCH including a first transmission occasion and a second transmission occasion following the first transmission occasion during a single slot;
means for determining, at the UE, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion; and
means for determining, at the UE, an overall processing time following a last symbol of the PDSCH, wherein the overall processing time comprises a first portion of processing time and a second portion of processing time, and wherein the second portion of processing time is the processing time corresponding to the first transmission occasion.

21. The apparatus of claim 20, wherein the DCI indicates two transmission configuration indicator (TCI) states within the single slot, and wherein the overall processing time follows a last symbol of the second transmission occasion.

22. A non-transitory computer-readable medium storing instructions that, when executed by a processor, cause the processor to perform operations comprising:
receiving, at a user equipment (UE) from a wireless communication device, a downlink control information (DCI) scheduling a physical downlink shared channel (PDSCH), the PDSCH including a first transmission occasion and a second transmission occasion following the first transmission occasion during a single slot;
determining, at the UE, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion; and
determining, at the UE, an overall processing time following a last symbol of the PDSCH, wherein the overall processing time comprises a first portion of processing time and a second portion of processing time, and wherein the second portion of processing time is the processing time corresponding to the first transmission occasion.

23. The non-transitory computer-readable medium of claim 22, wherein the operations further comprise transmitting, from the UE to the wireless communication device, a hybrid automatic repeat request acknowledgement (HARQ-ACK) at a time after the PDSCH that is greater than or equal to the overall processing time.

24. A method of wireless communication, the method comprising:
transmitting, from a wireless communication device to a user equipment (UE), a downlink control information (DCI) scheduling a physical downlink shared channel (PDSCH), the PDSCH including a first transmission occasion and a second transmission occasion following the first transmission occasion during a single slot;

determining, at the wireless communication device, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion;

determining, at the wireless communication device, an overall processing time of the UE following a last symbol of the PDSCH, wherein the overall processing time comprises a first portion of processing time and a second portion of processing time, and wherein the second portion of processing time is the processing time corresponding to the first transmission occasion; and scheduling a hybrid automatic repeat request acknowledgement (HARQ-ACK) from the UE at a time after the PDSCH that is greater than or equal to the overall processing time.

25. The method of claim 24, wherein the overall processing time follows a last symbol of the second transmission occasion.

26. The method of claim 24, wherein:

when a length of the first transmission occasion is greater than or equal to seven symbols, the processing time is equal to zero symbols;

when the length of the first transmission occasion is between four and six symbols, the processing time is equal to seven symbols minus the length of the first transmission occasion;

when the length of the first transmission occasion is equal to three symbols, the processing time is equal to three symbols plus a minimum of d and one, d being a number of symbols of the DCI that overlap the first transmission occasion; and when the length of the first transmission occasion is equal to two symbols, the processing time is equal to three symbols plus d.

27. The method of claim 24, further comprising determining a combined processing time corresponding to a combination of the first transmission occasion and the second transmission occasion, wherein the combined processing time is determined based on a combined length of the first transmission occasion and the second transmission occasion.

28. An apparatus configured for wireless communication, the apparatus comprising:

at least one processor; and memory coupled to the at least one processor, the memory comprising instructions executable by the at least one processor to cause the apparatus to:

initiate transmission, from a wireless communication device to a user equipment (UE), of a downlink control information (DCI) scheduling a physical downlink shared channel (PDSCH), the PDSCH including a first transmission occasion and a second transmission occasion following the first transmission occasion during a single slot;

determine, at the wireless communication device, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion;

determine, at the wireless communication device, an overall processing time of the UE following a last symbol of the PDSCH, wherein the overall processing time comprises a first portion of processing time and a second portion of processing time, and wherein the second portion of processing time is the processing time corresponding to the first transmission occasion; and schedule a hybrid automatic repeat request acknowledgement (HARQ-ACK) from the UE at a time after the PDSCH that is greater than or equal to the overall processing time.

29. The apparatus of claim 28, wherein the DCI indicates two transmission configuration indicator (TCI) states within the single slot.

30. An apparatus configured for wireless communication, the apparatus comprising:

means for transmitting a downlink control information (DCI) to a user equipment (UE), the DCI scheduling a physical downlink shared channel (PDSCH), the PDSCH including a first transmission occasion and a second transmission occasion following the first transmission occasion during a single slot;

means for determining a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion;

means for determining an overall processing time of the UE following a last symbol of the PDSCH, wherein the overall processing time comprises a first portion of processing time and a second portion of processing time, and wherein the second portion of processing time is the processing time corresponding to the first transmission occasion; and means for scheduling a hybrid automatic repeat request acknowledgement (HARQ-ACK) from the UE at a time after the PDSCH that is greater than or equal to the overall processing time.

31. The apparatus of claim 30, wherein the DCI indicates two transmission configuration indicator (TCI) states within the single slot, and wherein the overall processing time follows a last symbol of the second transmission occasion.

32. A non-transitory computer-readable medium storing instructions that, when executed by a processor, cause the processor to perform operations comprising:

initiating transmission, from a wireless communication device to a user equipment (UE), of a downlink control information (DCI) scheduling a physical downlink shared channel (PDSCH), the PDSCH including a first transmission occasion and a second transmission occasion following the first transmission occasion during a single slot;

determining, at the wireless communication device, a processing time corresponding to the first transmission occasion, wherein, when a mapping type of the first transmission occasion is a second mapping type of at least two mapping types and a processing capability of the UE is a first capability type of at least two capability types, the processing time is determined based on a length of the first transmission occasion;

determining, at the wireless communication device, an overall processing time of the UE following a last symbol of the PDSCH, wherein the overall processing time comprises a first portion of processing time and a second portion of processing time, and wherein the second portion of processing time is the processing time corresponding to the first transmission occasion; and scheduling a hybrid automatic repeat request acknowledgement (HARQ-ACK) from the UE at a time after the PDSCH that is greater than or equal to the overall processing time.

33. The non-transitory computer-readable medium of claim 32, wherein the operations further comprise determining, at the wireless communication device, a first portion of processing time of the overall processing time based on a mapping of a processing capability of the UE, a subcarrier spacing associated with the PDSCH, and whether one or more additional positions for demodulation reference signal (DMRS) symbols are configured.

* * * * *